United States Patent
Burmaster et al.

[15] 3,661,190
[45] May 9, 1972

[54] REDUCTION OF AIR CONTAMINATE EMISSIONS FROM STORAGE VESSELS

[72] Inventors: Neal C. Burmaster, Yorba Linda; Bruce A. Harbolt, Northridge; Delbert W. Block, Palos Verde Estates, all of Calif.

[73] Assignee: Union Oil Company of California, Los Angeles, Calif.

[22] Filed: Sept. 11, 1970

[21] Appl. No.: 71,307

[52] U.S. Cl. ............................ 141/11, 141/69, 141/286, 141/387, 285/184
[51] Int. Cl. ............................ B65b 1/04, B65b 3/04
[58] Field of Search ............ 141/4, 5, 44, 48, 49, 50, 54–58, 141/63, 64, 85, 89, 91, 92, 93, 97, 99, 11, 69, 70, 286, 387; 285/184

[56] References Cited

UNITED STATES PATENTS 2,965,196   12/1960   Rich ........................................ 141/11

Primary Examiner—Houston S. Bell, Jr.
Attorney—Milton W. Lee, Richard C. Hartman, Lannas S. Henderson, Dean Sandford and Robert E. Strauss

[57] ABSTRACT

A method and apparatus is disclosed for reducing the emission of volatilized constituents from vessels, particularly vessels used to transport liquid solutions, as they are being filled with a liquid solution containing the volatile constituent. The apparatus comprises a packed column having universal means to temporarily mount the column in a vertical position over a vapor discharge port of the vessel with means to introduce solvent into the column in countercurrent flow therein to the vessel vapor effluent. The solvent from the column enriched with the volatile constituent is discharged directly into the vessel and the purified gas effluent is released to the atmosphere.

8 Claims, 3 Drawing Figures

PATENTED MAY 9 1972      3,661,190

INVENTORS
NEAL C. BURMASTER
BRUCE A. HARROLT
BY  DELBERT W. BLOCK

Robert Shaum
ATTORNEY

3,661,190

REDUCTION OF AIR CONTAMINATE EMISSIONS FROM STORAGE VESSELS

DESCRIPTION OF THE INVENTION

This invention relates to an apparatus and method for reducing the emission of air contaminants from vessels and, more particularly, to an apparatus and method for reducing the emission of volatilized contaminants in the gaseous effluent displaced from storage vessels of marine craft. The apparatus and method of this invention has particular application to the reduction of ammonia emission to the atmosphere from such vessels as they are filled with aqua-ammonia.

The continued rate of industrialization of the developed countries as well as their increasing and widespread use of fertilizers in agronomy has recently focused attention on pollution of the ecology and, particularly, on air pollution. The filling of storage vessels with solutions containing volatile constituents invariably results in the loss of some of the volatile constituents by evaporation into the vapor space of the vessels and ensuing displacement from the tanks as they are filled with the liquid solution. Immobile storage vessels that are frequently filled and emptied are often permanently vented to vapor treatment facilities which prevent discharge of volatilized contaminants into the atmosphere during the filling. Many vessels, however, are filled too infrequently or are too remote to warrant the expense of such permanent recovery facilities. The problem is particularly acute in the filling of transport vessels and, particularly, vessels on marine craft, since these vessels are difficult to connect to permanent vapor treatment facilities because of the remoteness of the loading sites and the variation in sizes and shapes of the vessels as well as their vent facilities. As a result, the filling of these tanks often results in undesired, and heretofore unprevented, discharge of vaporous products into the atmosphere.

The total amount of vaporous product vented to the atmosphere during filling of a vessel is low and represents a loss of product which, for the most part, is too insignificant to justify the cost of vapor treatment facilities. The concentration of the vaporous product in the gaseous effluent from the vessel, on the other hand, can be quite high, constituting several volume percent of this effluent. This high concentration presents a pollution problem in the immediate environment of the vessel particularly when handling aqua-ammonia since the threshold of ammonia detection in humans is about 50 parts per million and substantial dilution of the effluent is necessary before its presence is not objectionable. As a consequence, many United States ports have enacted air pollution control regulations requiring the merchant vessel to either load at night or take appropriate measures to reduce the total ammonia emissions.

Since the cost for permanent treatment facilities to recover volatilized products from a vessel's effluent vapors is generally greater than the value of the recovered product during the life of the facilities, the recovery apparatus must be constructed with a minimum of expense. For example, pumps and means for the circulation of an independent absorption liquid require substantial capital investment and incur high operating expenses and are, therefore, undesirable. Moreover, the apparatus should permit simple and quick connection to the transportation vessels and should operate in an efficient manner and require little, if any, operating attendance.

It is, therefore, an object of this invention to provide a simple apparatus for reducing the emission of volatilized constituents from vessels which are filled with solutions containing the volatile constituents.

Another object of the invention is to provide such apparatus with means for removable attachment to vessels and, particularly, to vessels used to transport such solutions and a method for use of such apparatus.

Another object of this invention is to provide such apparatus which can be directly connected to the existing ports of storage vessels on marine craft while maintaining the apparatus in a substantially vertical position.

Another object of this invention is to provide a method for reducing the emission of ammonia from vessels as they are being filled with aqueous solutions of ammonia.

Other and related objects of this invention will become apparent from the following description of the invention.

The foregoing objects and their attendant advantages can be realized by the method of this invention which comprises connecting the vapor space of a vessel being filled with a liquid solution containing a volatile constituent to an inlet means of a packed absorption column and introducing a liquid solvent into the column to counter-currently contact the vapor effluent which contains the volatilized constituent and which is displaced from the vessel. The solvent enriched with the absorbed volatile constituent from the column is allowed to drain directly into the vessel and into admixture with the liquid solution therein.

The absorption apparatus of this invention comprises a hollow columnar means having inlet and outlet means and containing inert packing between the inlet and outlet means and resting on permeable support means which traverse the interior of the column. Means are provided for the introduction of a liquid into the column above the packing and for discharge of the liquid from the column. The inlet means of the column is connected to the vapor space of the storage vessel by bolting the column inlet to a vapor discharge port in the vessel and the outlet means of the column is vented to the atmosphere.

Vessels, particularly those used for transport, often have their upper surfaces or vent flange surfaces inclined in relation to the horizontal. Successful operation of a counter-current scrubbing system such as used in this invention requires that the column be in a substantially vertical position. Accordingly, the apparatus of this invention also includes universal mounting means that allow a varied angular disposition between the column and its supporting surface, thereby permitting vertical alignment of the column independently of the inclination of its supporting surface.

The invention will now be described by reference to the FIGURES of which:

Figure 1:
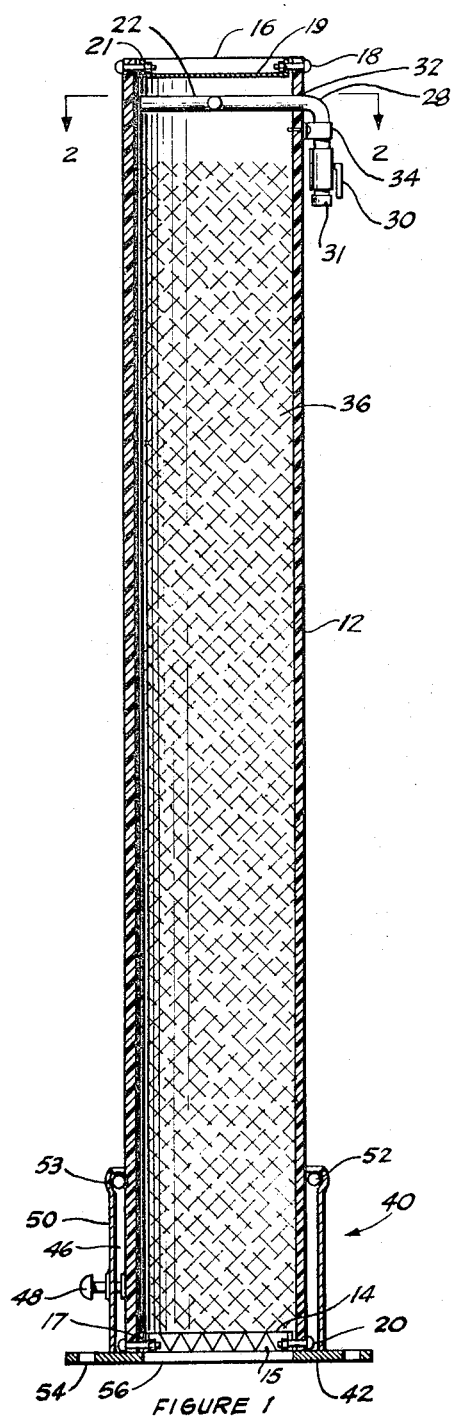
FIG. 1 is a vertical cross-sectional view of an apparatus of this invention.
Figure 2:
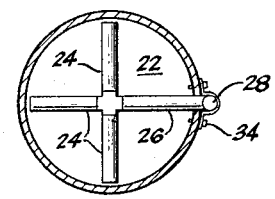
FIG. 2 is a cross-sectional view of the apparatus taken along line 2—2 in FIG. 1.

Referring now to FIGS. 1 and 2, the apparatus of this invention comprises a hollow columnar means 12 having a vapor inlet means 15 and vapor outlet means 16. As shown, this is an open-ended cylinder. Disposed at an intermediate location between the inlet and outlet means is fluid permeable support means 14 which is an apertured plate that traverses the interior of the cylinder. The packing means 36 is supported by this plate and extends along a substantial portion of the vertical length of the column. Communicating with the interior of the column at an elevation above the packing means is liquid introduction means 22 which can simply be a perforated pipe with apertures which distribute liquid across the column.

The column 12 has means for its removable support on a surface conjunctive with an enclosed vessel which comprises adapter 40 that is shown as a short sleeve 50 bearing a base plate 42 with apertures 54 to permit its flanged attachment to mating flanges of such vessel. Plate 42 has a central opening 56 to permit vapor transmission from the enclosed vessel to the inlet means of column 12 and to provide means permitting drainage of liquid from the column and into the vessel. The adapter 40 also has universal means that permits a varied angular disposition between the column 12 and plate 42 which comprises sleeve 50 which is of substantially greater diameter than column 12 to provide annular space 46 therebetween and collapsible ring 52 which is yieldably engaged between column 12 and sleeve 50 to serve partly as a pivotal center for column 12 within adapter 40.

Means to lock the column at any angular position within adapter 40 are provided as threaded studs 48 which are inserted in tapped bores in adapter 40.

The column 12 can be constructed with any cross-sectional configuration, however, for ease in construction and maintenance of uniform liquid flow across the column's cross-sectional area, cylindrical columns are preferred. The column can be built with any conventional construction material, however, it is preferred that a light material be selected to allow easy handling of the column, preferably by one man, in transferring the column from tank to tank. Useful materials include plastics such as polyesters, polyolefins, polyvinyl chloride, epoxide resins which are, preferably, reinforced with fiberglass, asbestos, metal filaments, etc. Sheet metal such as steel, stainless steel, aluminum or aluminum or magnesium alloys may also be employed. As apparent to those skilled in the art, selection of any material should be made with due regard to solvent properties and corrosivity of the volatile constituent and/or the solvent encountered with the apparatus.

The packing 36 is retained within column 12 by fluid permeable plates 14 and 19 during movement of the column and rests on plate 14 when the column is in use. The permeable plates can be perforated discs, screens, grids, etc., which allow liquid and gas to freely pass through the plate but which will retain the packing 36. The porous plate 14 is welded to ring 17 and the ring is bolted to the bottom of open-ended column 12 by bolts 20. Porous plate 19 which can be formed of expanded metal such as aluminum is welded to ring 21 and the ring is bolted to the top of the column by bolts 18 to provide means for retaining the packing within the column when the column is tilted to its side such as occurs when the apparatus is in transit or during handling. In its preferred embodiment, the support plate 14 is formed from expanded metal, typically aluminum and is corrugated as shown to allow the scrubbing liquid to drain from the folds or grooves in the plate and the gas to sparge through the plate at rises in the corrugation. In this manner the corrugations aid in preventing excessive channeling of the gases through the column.

The column is filled along a substantial portion of its length with a suitable packing 36 to provide an intimate and uniform contact between the scrubbing liquid and gas mixture. The packing can be of any cross-sectional shape and size, however, it is preferred to use a packing that does not have a high pressure drop across the column. Exemplary packing includes pall rings, berl saddles, Intalox saddles, etc., having a mean diameter between about ⅛ to 2 inches. A particularly preferred packing is 1-inch diameter polypropylene Intalox saddles.

The liquid distributor 22 is illustrated in a cross-sectional view in FIG. 1 and in a top cross-sectional view in FIG. 2. As shown in the drawing, the distributor 22 is formed of conventional tubing such as polyvinyl chloride, stainless steel or galvanized steel pipe and cross-shaped with three distributor arms 24 and one feeder arm 26. The undersurface of the tubing of these arms is perforated with a plurality of apertures which are so spaced along the tubing and so oriented as to achieve a uniform distribution of liquid across the cross section of the column. While a cross-shaped configuration for the distributor is illustrated, it is recognized that any other configuration can be employed which provides a uniform distribution of scrubbing fluid over the circular cross section of the column. The feeder arm 26 is connected to valve 30 through piping 28 which extends through hole 32 in the wall of column 12. The valve is in turn connected to attaching means 31 permitting its removable attachment to a suitable source of scrubbing fluid such as a threaded nipple, hose connector, etc. The distributor and valve assembly is secured to the outside of the column with clamp 34.

Figure 3:
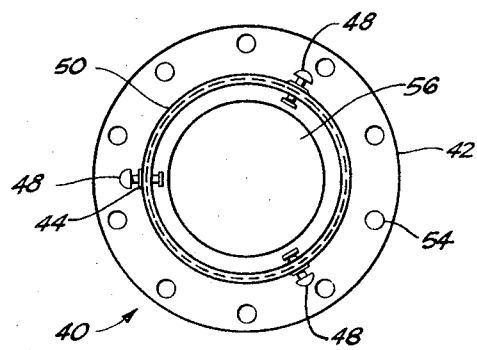
FIG. 3 is a plane view of the column adaptor illustrated in FIG. 2.

The inlet 15 of column 12 is connected in a fluid-tight seal to the storage tank by a universal adapter 40 which is illustrated in a cross-sectional view by FIG. 1 and in a planar view by FIG. 3. In the preferred embodiment, the adapter comprises a flange plate 42, sleeve 50 and collapsible ring 52. Sleeve 50 has an annular groove 53 which is rolled into its inner periphery at a location along its length, preferably adjacent its upper end, as shown, an O-ring 52 is seated in this groove in fluid-tight contact with the outer surface of column 12 when the column is inserted into the adapter. Column 12 is thus free to tilt within the confines of adapter 40 which surrounds the lower extremity of this column. The base of column 12 rests on flanged plate 42 and can be locked in any angular position within adapter 40 by studs 48 which have a large head to permit hand advance or retraction of the studs 48 in nuts 44 which are welded to the outer surface of sleeve 50.

The cylindrical sleeve 50 has an inside diameter substantially greater than the outside diameter of the column so as to allow the column to be inserted within the shell and to pivot therein at least 5°, and, preferably, at least 7° in any direction while within the sleeve. The bottom of sleeve 50 is welded to the flanged plate 42 in a substantially central position on the plate.

The flanged plate 42 has bolt holes 54 spaced around its periphery outside the cylindrical sleeve 50 to mate with similarly spaced holes on the conventional flanges of vessels to allow the plate to be bolted to such flanges. Flanged plate 42 also has a centrally located access hole 56, which preferably has a lesser diameter than the outside diameter of column 12, to allow gases from the vessel on which the column is attached to enter the bottom of the column and also to allow the scrubbing fluid to drain into the storage tank.

It is apparent that the above-described adaptor is only one embodiment of the universal adapter means of this invention and that any adapter which permits a varied angular disposition between the column and a vessel opening and allows the column to be vertically aligned independently of the inclination of the opening can be employed herein.

In operation, at least one of the columns is bolted to a flanged opening of a vessel, such as, a butterworth opening in a merchant marine craft, and aligned so that the column is in a substantially vertical position. The liquid solution of a volatile constituent is pumped into the tank thereby displacing from the tank a portion of the residual air which contains volatilized amounts of the volatile constituent. All openings such as vents in the vessel except those which are connected to the column 12 are closed and the displaced air and vapor mixture is forced into the bottom of the column through the vessel opening. A solvent liquid or scrubbing fluid is introduced at the top of the column and passes countercurrent over the packing in the column with the rising gas mixture. As the scrubbing fluid passes downwardly in the column, it absorbs substantially only the contaminate vapors from the upwardly moving gas stream. When the scrubbing fluid reaches the bottom of the column it falls directly into the storage tank and mixes with the storage or cargo liquid. The scrubbed gases leaving the column are vented directly to the atmosphere or alternatively the gases are discharged into a common header which vents to the atmosphere.

The scrubbing fluids are selected so as to possess a high solubility for the contaminate vapors while possessing a low solubility for the other effluent gases, normally air, and such fluids are very efficient in the operation of the column. In addition, it is preferred that the scrubbing fluid be selected so that it does not adulterate the solution in the vessel. Thus when an aqueous solution is the storage solution, water or a more dilute aqueous scrubbing liquid is preferably employed. For example, when volatile aqueous acid solutions, such as, hydrochloric, nitric, sulfuric and phosphoric acids, or other volatile aqueous solutions such as, aqua-ammonia, etc. are the storage solutions, water can be employed as the solvent or scrubbing fluid.

The apparatus of this invention has particular application to the reduction of emissions of vaporous ammonia from storage vessels of marine craft as they are filled with aqua-ammonia. In this application, the vents in the storage tanks are closed and the residual gases, i.e., air and liberated ammonia vapors in the tank displaced by the incoming aqua-ammonia is passed directly into an absorption column vertically bolted to one of the butterworth openings. Water is introduced into the top of the column and passes countercurrent with the air-ammonia gas mixture and gravity drains directly into the storage tank.

The gas leaving the top of the absorption column contains very little ammonia and can be vented to the atmosphere. It is preferred to operate the absorption column so that the ammonia leaving the column contains less than 300 parts per million of ammonia and more preferably below 100 parts per million.

The following illustrates a preferred mode of use of the invention for removing ammonia vapors from a gaseous mixture of air and ammonia displaced from a tank on a marine craft during loading of aqua-ammonia. The apparatus is constructed with the same cross-sectional configuration as presented in the drawings. The column comprises a 6-foot high, b 10-inch diameter, fiberglass column filled with 1-inch diameter polypropylene Intalox saddles. The top and bottom of the column is closed with 10-inch diameter plates of expanded aluminum and the bottom plate is corrugated with 1-inch corrugations. The fluid distributor constructed as substantially shown in FIG. 2, is located 2 inches from the top of the column and comprises ¾-inch diameter polyvinyl chloride pipe having forty ⅛-inch diameter holes drilled uniformly along the bottom of the pipe. The distributor is connected through a valve to a fresh water supply capable of delivering at least 20 gallons of water per minute.

The adapter is constructed of a 17-inch diameter circular steel plate ¼-inch thick with 10 1-inch diameter bolt holes drilled uniformly around its periphery 7 ⅝-inches from the plate center to fit similar holes about the periphery of the flanges on the vessel. A 12-inch diameter, ⅛-inch thick carbon steel shell, 10 inches in height, is centered on the plate and welded thereon to provide a fluid tight seal. The top of the shell is rolled to form a groove to hold a b 12-inch diameter O-ring formed of a ¾-inch hollow neoprene tube. Three ⅝-inch diameter nuts are welded to the shell over ⅝-inch diameter holes spaced 120° apart at 3 ¾ inches above the base plate. Three bolts 1 ½ inches in length are threaded into the nuts.

The adapter is bolted to a butterworth opening over the storage tank to be filled to provide a fluid tight seal. The butterworth opening is located on the deck of the merchant vessel and its flange is inclined at an angle of about 4° from horizontal. The column is inserted into the adapter, tilted into a substantially vertical position, sufficient to offset the incline of the butterworth opening, and secured in this position by tightening the hand screws.

Aqua-ammonia having an ammonia concentration of about 27.5 weight percent is pumped into the storage tank at a rate of approximately 1,000 barrels per hour. Air and liberated ammonia vapors are displaced from the tank by the incoming aqua-ammonia and are forced into the bottom of the column. Water is introduced into the top of the column and is allowed to drain over the packing and into the tank, and the gas upon leaving the column is vented directly to the atmosphere.

The amount of ammonia in the gas phase above the aqua-ammonia is periodically measured along with the ammonia content of the gas vented to the atmosphere. These concentrations are reported in the Table below to demonstrate the ammonia vapor reduction through the column for various water flow rates. The rate of water flow to the column is also limited so that excessive dilution of the vessel's contents does not occur. Typically, the rate of flow can be maintained less than that amount which will decrease the concentration of ammonia by an increment of 2 weight percent. Preferably the amount of water so introduced is insufficient to dilute the aqua ammonia by no more than 0.5 and, most preferably, no more than 0.3, weight percent. The ammonia concentration of the aqua-ammonia after filling of the vessel is typically 27 weight percent.

TABLE

Ammonia Vapor Concentration Tests

| Test No. | Water Rate (gals/min) | Ammonia Concentration Entering (ppm) | Ammonia Concentration Exiting (ppm) | Reduction Percent |
|---|---|---|---|---|
| 1. | 6 | 41,000 | 260 | 99.37 |
| 2. | 12 | 90,000 | 160 | 99.83 |
| 3. | 14 | 356,000 | 10 | 99.99 |

The preceding example is presented solely to illustrate the preferred mode of practice of the invention and to demonstrate results attained therewith. It is not intended that the example be construed as unduly limiting the invention but instead it is intended that the invention include only the various restrictions set forth in the following claims.

We claim:

1. An apparatus for absorption of volatile constituents from a vaporous effluent of an enclosed vessel which comprises:
   hollow columnar means having inlet and outlet means;
   fluid permeable packing support means traversing the interior of said columnar means and positioned at an intermediate location between said inlet and outlet means;
   packing means within said columnar means resting on said support means;
   liquid introduction means communicating with the interior of said columnar means above said packing means; and
   means to removably support said column on a surface conjunctive with said enclosed vessel including:
   1. means for connecting said inlet means to a vapor effluent port of said enclosed vessel;
   2. drain means connecting the base of the interior of said columnar means to said enclosed vessel; and
   3. universal means permitting a varied angular disposition between said surface and columnar means to thereby permit vertical alignment of said columnar means independently of the inclination of said surface.

2. The apparatus defined in claim 1 wherein said universal means permits inclination of said column relative to said surface of at least 7° in any direction.

3. The apparatus defined in claim 1 wherein said vapor effluent is a butterworth opening on a merchant vessel.

4. An apparatus for absorption of volatile constituents from a vaporous effluent stream of an enclosed vessel which comprises:
   a cylindrical open-ended column;
   liquid distributor means positioned near the top within said column for uniformly introducing a liquid solvent into said column;
   fluid permeable support plates traversing the interior of said column;
   packing means positioned within said column between said fluid permeable support plates to effect uniform distribution of said liquid solvent through at least a portion of said column;
   an adaptor comprising a cylindrical sleeve encompassing the bottom of said column and having an inside diameter sufficiently greater than the outside diameter of said column to form an annular space therebetween of sufficient width to allow said column to tilt at least 5° in any direction, a flange secured to the base of said sleeve and having a centrally located hole with a diameter less than the diameter of said column; and
   yieldable sealing means between said column and the upper portion of said sleeve to provide a fluid tight seal between said sleeve and said column and being sufficiently yielding to allow said column to tilt at least 5° in any direction.

5. In a method for the filling of vessels with a solution of a volatile constituent in a liquid solvent which solution has appreciable volatility at the conditions of temperature and pressure encountered during the filling of said vessels, the improved method for preventing the escape of volatilized amounts of said volatile constituent which comprises:
   connecting the vapor space of said vessel to the inlet of a column containing a bed of inert solid packing;

introducing into said column, while filling said vessel, said liquid solvent to contact therein with said volatile constituent displaced from said vessel;

discharging said liquid solvent enriched with said volatile constituent from said column into said vessel and into admixture with said solution contained therein;

ceasing said introducing of solvent and disconnecting the vapor space of said vessel from said inlet of said column upon completion of said filling.

6. The method defined in claim 5 wherein said volatile constituent is ammonia and wherein said liquid solvent is water.

7. In a method for the filling of marine craft vessels with a solution of aqua-ammonia, the improved method for preventing the escape of volatilized amounts of ammonia from said aqua-ammonia solution which comprises:

connecting the vapor space of said vessel to the inlet of a column containing a bed of inert solid packing;

introducing liquid water into said column while filling said vessel to contact therein with said volatilized ammonia displaced from said vessel;

directly discharging said liquid water enriched with ammonia from said column into said vessel and into admixture with said aqua-ammonia solution contained therein; and ceasing said introduction of water; and disconnecting the vapor space of said vessel from said inlet of said column upon completion of said filling.

8. The method defined in claim 7 wherein 27.5 weight percent aqua-ammonia solution is charged into said storage tank and the rate of water introduced into said column is controlled so that the ammonia concentration in tank at the end of said filling is above about 27 weight percent.

* * * * *